March 25, 1969  I. R. RITSEMA  3,434,195

METHOD OF FORMING A LASH-FREE UNIVERSAL JOINT

Filed March 27, 1967

INVENTOR.
IRVING R. RITSEMA
BY
William N. Antonis
ATTORNEY

INVENTOR.
IRVING R. RITSEMA
BY
William N. Antonis
ATTORNEY

United States Patent Office 3,434,195
Patented Mar. 25, 1969

3,434,195
METHOD OF FORMING A LASH-FREE UNIVERSAL JOINT
Irving R. Ritsema, South Bend, Ind., assignor to The Bendix Corporation, a corporation of Delaware
Filed Mar. 27, 1967, Ser. No. 626,148
Int. Cl. B23p 11/00
U.S. Cl. 29—437                                3 Claims

ABSTRACT OF THE DISCLOSURE

The following relates to a universal joint of the type sometimes referred to as a Hooke's Coupling and to a novel method of making same. The universal joint consists of two angularly disposed rotatable tubular members, each of which has a forked portion formed on the end thereof, and a block having two pairs of diametrically opposed protruding spherical surfaces formed thereon which are received in concave seats formed in the forked portion by deforming the forked portions around the protruding spherical surfaces of the block.

Background of the invention

No-lash universal joints of the type described herein are disclosed in Runkle Patent No. 3,217,516 and in Runkle Patent No. 3,296,830. In both of these patents adjustable washer type coupling means are utilized to connect the angularly disposed rotatable forked members and to eliminate the lash therebetween. This particular construction has been found very suitable for steering columns and is presently incorporated in various passenger cars having a tiltable steering column. The universal joint construction described hereinafter which was conceived for applications requiring low torque, low speeds, and moderate angles, requires fewer parts and is somewhat less expensive to fabricate. Furthermore, it is designed so that a preselected initial load can be applied to the joint to eliminate any lash which may still exist after fabrication by a forming process.

Summary of the invention

Accordingly, it is an object of this invention to provide a novel method of fabricating a relatively inexpensive universal joint which is relatively small in size, free from backlash, and which avoids various problems encountered in the assembly of prior art constructions.

Another object of this invention is to provide a method of forming a lash-free universal joint having a minimum number of parts.

More specifically, it is an object of this invention to provide a method of forming a lash-free universal joint for joining two angularly disposed rotatable tubular members each having a pair of spaced diametrically opposed arms extending therefrom comprising the steps of interposing between said spaced arms a block having two pairs of diametrically opposed protruding spherical surfaces formed thereon, deforming said arms around said protruding spherical surfaces to form concave seats in the arms for receiving the protruding spherical surfaces, and drawing the arms of each of the members towards each other through an adjustable mechanism to provide intimate lash-free contact between the seats and the protruding spherical surfaces.

The above and other objects, features and advantages of the invention will become apparent from the following description taken in connection with the accompanying drawings which form a part of this invention and in which:

Description of the preferred embodiment

Figure 16:
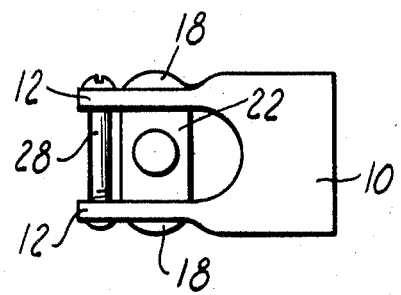
FIGURE 16 shows a plan view of one-half of an assembled universal joint.
Figure 17:
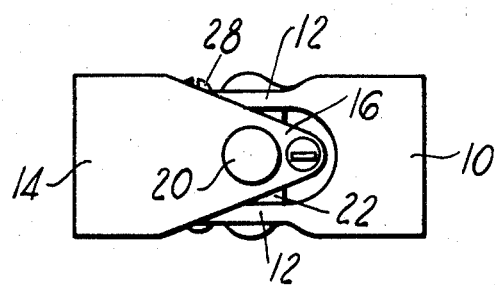
FIGURE 17 shows a plan view of a completely assembled universal joint.

Referring to FIGURES 16 and 17, it will be noted that numeral 10 indicates a forked tubular member having a pair of spaced arms 12 located at one end thereof, and that numeral 14 indicates a second similar forked tubular member having a pair of spaced arms 16 also located at one end thereof. Diametrically opposed concave seats 18 are located in the arms 12, whereas similar opposed concave seats 20 are located in the arms 14. It will be noted that the concave seats 18 are centered in the same plane with the concave seats 20, but are located at right angles with respect thereto.

Figure 1:
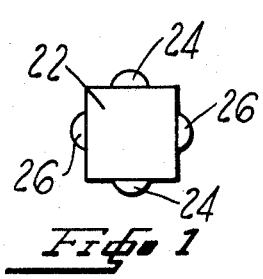
FIGURES 1 and 2 show front and end views, respectively, of the coupling block utilized in the universal joint.
Figure 2:
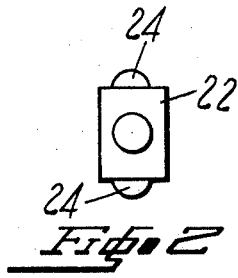

A block 22, as shown in FIGURES 1 and 2, is interposed between the spaced arms 12 and the spaced arms 16, and includes a first pair of diametrically opposed protruding spherical surfaces 24 and a second pair of diametrically opposed protruding spherical surfaces 26 which are disposed at right angles with respect to the first pair. The spherical surfaces 24 are received in the concave seats 18, whereas the spherical surfaces 26 are received in the concave seats 20.

In order to eliminate lash from the universal joint, suitable means, such as a threaded bolt or screw 28, which has the head end in abutment with one arm and the other end in threaded engagement with the oppositely disposed arm, can be utilized. Thus, by rotating the threaded member 28 it is possible to cause the oppositely disposed arms to move towards each other to thereby provide lash-free contact between the protruding spherical surfaces of the block and the concave seats of the arms. After the desired preload has been achieved the end of the screw can be peened, if desired.

Figure 3:
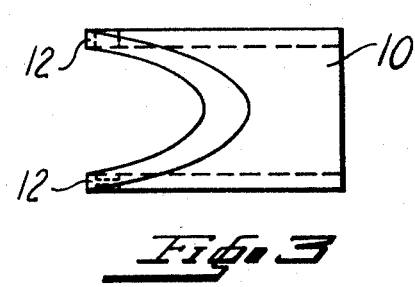
FIGURES 3, 4, and 5 show front, end, and top views of one of the forked tubular members utilized in the universal joint after cutting away oppositely disposed allochiral portions of the tubular member.
Figure 4:
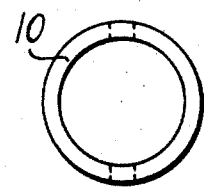
Figure 5:
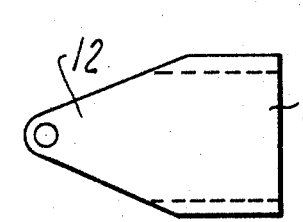
Figure 6:
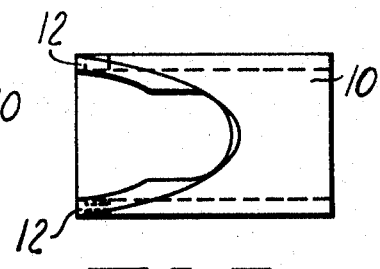
FIGURES 6 and 7 show similar views of one of the forked tubular members after the base of the fork has been drilled to provide adequate space for the coupling block.
Figure 7:
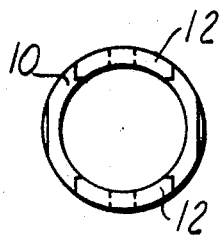

It will be noted from the foregoing that the joint includes only two forked tubular members 10 and 14, a center block 22, and a pair of bolts 28. Each of the forked tubular members is formed by first cutting away oppositely disposed allochiral portions of a tube at an angle with respect to the axis of the tube, as shown in FIGURES 3–5. Although this in itself will provide a pair of spaced arms at the end of the tube, in order to provide adequate space for the coupling block 22 the base of the fork is drilled to provide a configuration as shown in FIGURES 6 and 7.

Figure 8:
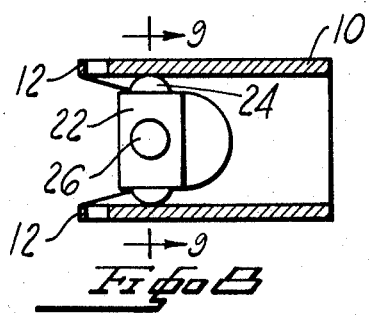
FIGURE 8 is a longitudinal sectional view through one of the forked members and the coupling block prior to fabrication.
Figure 9:
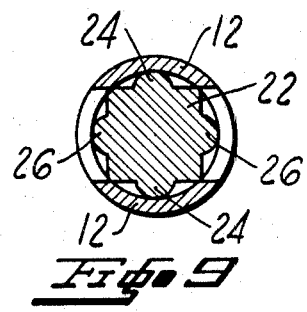
FIGURE 9 is a sectional view through line 9—9 of FIGURE 8.
Figure 10:
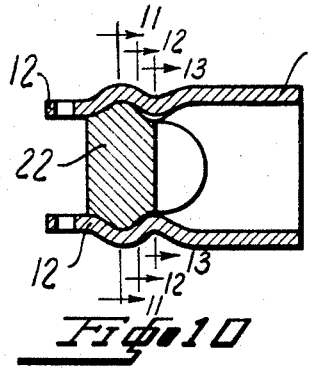
FIGURE 10 is a longitudinal sectional view through one of the forked members and the coupling block after fabrication.
Figure 11:
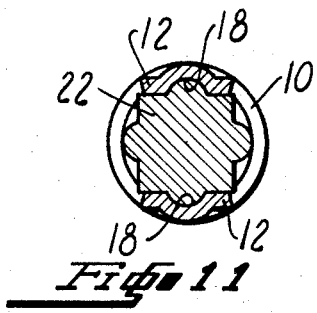
FIGURES 11, 12, and 13 are sectional views taken along lines 11—11, 12—12, and 13—13, respectively, of FIGURE 10.
Figure 12:
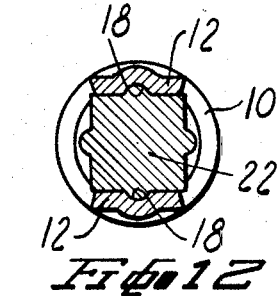
Figure 13:
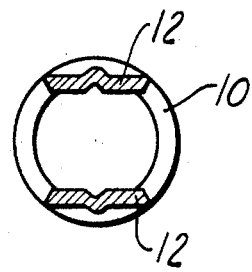
Figure 14:
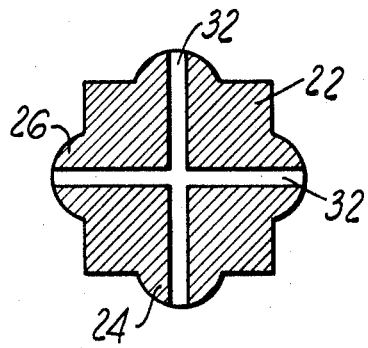
FIGURES 14 and 15 show various methods of creating cavities for reserve lubrication in the coupling block.
Figure 15:
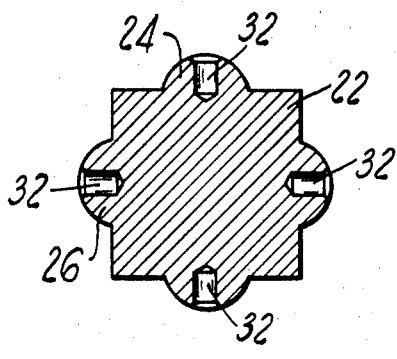

After the forked tubular members 10 and 14 are formed in the foregoing manner the universal joint is fabricated by inserting the center coupling block 22 within one of the forked members, as shown in FIGURES 8 and 9. The arms of the tubular member are then deformed around the protruding spherical surfaces of the block, as shown in FIGURES 10–13, by any suitable means, such as by coining. Such deformation of the arms causes them to assume the shape of the center block, but still permits pivotal movement of the block with respect to the arms. The arms of the other tubular member are then located over the remaining two oppositely disposed protruding spherical surfaces, and a similar deforming operation is performed. This permits the two tubular members to pivot in planes which are perpendicular to each other. A screw 28 or similar attaching device, is then placed through the oppositely disposed arms of each of the tubular members and is adjusted to provide the desired preselected load. If desired, the center block 22 could be constructed with passages or cavities 32 of the types shown in FIGURES 14 and 15 for containing and communicating lubricant to the protruding spehrical surfaces formed on the block.

The advantages and many applications of a universal joint which has the foregoing described features will be obvious to those skilled in the art. Furthermore, although this invention has been described in connection with certain specific embodiments, it will be obvious to those skilled in the art that various changes may be made in the form, structure, and arrangement of parts without departing from the spirit of the invention.

Accordingly, I do not desire to be limited to the specific embodiments disclosed herein primarily for purposes of illustration, but instead desire protection falling within the scope of the appended claims.

Having thus described the various features of the invention, what I claim as new and desire to secure by Letters Patent is:

1. A method of forming a lash-free universal joint for joining two angularly disposed rotatable members each having a pair of spaced diametrically opposed arms extending therefrom, said arms of one of said members being located at right angles with respect to the arms of the other of said members, comprising the steps of interposing between said spaced arms a block having two pairs of diametrically opposed protruding spherical surfaces formed thereon which are disposed at right angles with respect to each other, deforming said arms around said protruding spherical surfaces to form concave seats in said arms for receiving said protruding spherical surfaces, and drawing each pair of diametrically opposed arms towards each other through means of an adjustable mechanism connecting said arms to thereby maintain continuous intimate lash-free contact between said protruding spherical surfaces of said block and the associated concave seat as of said arms.

2. A method of forming a lash-free universal joint, as defined in claim 1, wherein said adjustable mechanism includes a threaded member extending through and engaging each pair of spaced arms for causing movement of said arms towards each other upon rotation of said threaded member.

3. A method of forming a lash-free universal joint, as defined in claim 2, wherein said arms are deformed by coining said arms down upon the protruding spherical surfaces of said block.

References Cited
UNITED STATES PATENTS

| | | | |
|---|---|---|---|
| 2,213,448 | 9/1940 | Morton | 29—438 |
| 2,238,335 | 4/1941 | Mac Gregor | 29—438 X |
| 2,355,781 | 8/1944 | Cardinal | 29—434 X |
| 2,624,907 | 1/1953 | Graham | 29—432 X |
| 3,045,455 | 7/1962 | Potgieter | 64—17 |

THOMAS H. EAGER, *Primary Examiner.*

U.S. Cl. X.R.

29—432; 64—17